United States Patent [19]

Dahlin

[11] Patent Number: 5,415,502

[45] Date of Patent: May 16, 1995

[54] DRILL AND TAP GUIDE

[76] Inventor: Bernard A. Dahlin, 1737 Carriage Ct., Green Bay, Wis. 54304

[21] Appl. No.: 201,424

[22] Filed: Feb. 24, 1994

[51] Int. Cl.$^6$ .................................. B23B 49/00
[52] U.S. Cl. ........................... 408/72 B; 408/76; 408/115 B; 408/241 B
[58] Field of Search ............... 408/1 R, 72 B, 115 B, 408/115 R, 76, 241 B

[56] References Cited

U.S. PATENT DOCUMENTS

| 907,735 | 12/1908 | Cain, Jr. | 408/115 R |
|---|---|---|---|
| 1,329,970 | 2/1920 | Hauser | 408/115 R |
| 2,661,641 | 12/1953 | Wood, Jr. | 408/115 R |
| 3,775,020 | 11/1973 | Stoutenberg | 408/115 R |
| 3,804,546 | 4/1974 | Boyajian | 408/115 R |
| 4,256,420 | 3/1981 | Day | 408/115 R |
| 4,461,603 | 7/1984 | Klee et al. | 408/115 R |

FOREIGN PATENT DOCUMENTS

| 2360370 | 4/1978 | France | 408/115 R |
|---|---|---|---|
| 1006237 | 4/1957 | Germany | 408/76 |
| 90409 | 5/1983 | Japan | 408/115 B |
| 121113 | 5/1989 | Japan | 408/241 B |

Primary Examiner—Daniel W. Howell
Attorney, Agent, or Firm—Donald Cayen

[57] ABSTRACT

A drill and tap guide comprises a block having appreciable thickness and one or more guide holes therethrough. The guide holes are sized to suit different diameter taps and/or drills. The guide holes are perpendicular to the plane of a block first face. The first face of the drill and tap guide is placed on a flat surface of a workpiece. A drill or tap is inserted through the appropriate guide hole, which guides the drill or tap to remain perpendicular to the workpiece flat surface during a hand drilling or tapping operation. The block may have a circular or rectangular periphery. Different combinations of guide holes to suit different size drills, tap drills, and taps can be formed in the block. In all cases, the guide holes are located close to the block periphery. A magnet can be embedded in the block to aid in holding the block on ferrous workpieces.

7 Claims, 5 Drawing Sheets

DRILL AND TAP GUIDE

BACKGROUND OF THE INVENTION

1. Field of the Invention

This invention pertains to machining workpieces, and more particularly to apparatus that aids in hand drilling and tapping holes.

2. Description of the Prior Art

It is well known to drill and tap holes by hand. A great number of electric hand-held drills are in everyday use by both professional and amateur machinists and craftsmen. Similarly, hand tapping is a common practice.

A major problem associated with hand drilling is that of producing a hole such that its longitudinal axis is perpendicular to the workpiece surface in which the hole is drilled. Jigs and fixtures are commonly used to guide drills in production operations used in industry. However, such jigs and fixtures are of little use in solving the hand drilling problems faced by home craftsmen or even by professional machinists. With hand operations, the person frequently must rely only on his eye to properly align the drill both before and during the drilling operation. Inaccurate holes are frequently the result. The person may use a small square to initially align the drill. However, during the course of the actual drilling, the square is invariably removed from against the drill, leaving it free to wander in space and thereby produce an inaccurate hole.

The problems associated with hand tapping holes are at least as great as those associated with hand drilling. Even if the hole to be tapped is accurate, there is no assurance that the hole will be tapped in an acceptable manner. That is because, like a hand-held drill, a hand-held tap is also free to wander in space as it is rotated by the machinist. Unless the tap longitudinal axis is concentric with the hole longitudinal axis, the tap will break. It is well known that tap breakage is caused by misalignment between the hole and the tap, and not merely by the torque applied to the tap.

As in drilling operations, the machinist may use just his eye to align a tap, or he may employ a square. Even if the tap is initially aligned in a perfect fashion, however, as soon as the tap is rotated it tends to wander and thereby enter the hole in a misaligned fashion. The all-to-common result is a broken tap.

Thus, a need exists for improvement in hand drilling and tapping operations.

SUMMARY OF THE INVENTION

In accordance with the present invention, a drill and tap guide is provided that enables persons to hand drill and tap holes more accurately than was previously possible. This is accomplished by apparatus that includes a block having multiple appropriately sized guide holes therethrough.

The block has a circular periphery and defines a longitudinal axis and has first and second opposed faces. At least the first face is perpendicular to the block longitudinal axis. The guide holes have respective longitudinal axes that are parallel to the block longitudinal axis. The guide holes are arranged near and around the block periphery.

In a preferred construction, the guide holes have diameters that are slightly greater than the diameters of respective different commonly used taps. The block thickness between the two faces is sufficient to accurately guide the taps in the respective guide holes. If desired, a magnet can be imbedded in the block. One end of the magnet is approximately flush with the block first face.

In use, a person places the first face of the drill and tap guide on a workpiece that is to be tapped. He aligns the appropriate guide hole in the drill and tap guide with the longitudinal axis of the hole to be tapped in the workpiece. If the workpiece is a ferrous material, the magnet assists retaining the drill and tap guide in place. The person then inserts the tap through the appropriate guide hole in the drill and tap guide, which maintains the tap perpendicular to the surface of the workpiece during the tapping operation. Consequently, tap breakage due to improper alignment of taps in tap drill holes is eliminated.

If desired, both faces of the block may be perpendicular to the block longitudinal axis. On the other hand, the faces may be non-parallel to each other in a manner that provides longer guide lengths for the larger diameter guide holes than for the smaller diameter guide holes.

In an alternate construction, a drill and a tap guide comprises a block having a rectangular or square periphery. The guide holes are close to the block periphery. A magnet can be used in a manner similar to the circular drill and tap guide.

In a further modified drill and tap guide, guide holes for both drills and taps are included. Respective pairs of drill and tap holes for each of several thread sizes are located around a block periphery.

In another construction, a drill and tap guide includes guide holes only for drills. Like the drill and tap guides that include guide holes for taps, the guide holes for the drills are located near the block periphery.

To improve chip removal while drilling holes in workpieces, the periphery of the block of a drill and tap guide may be grooved between its faces. The groove extends sufficiently toward the block longitudinal axis such that each guide hole becomes two concentric but separated holes, each in a flange associated with a block face. The separated guide holes provide ample guidance for the drills while simultaneously enabling chips to flow freely from the workpiece hole.

The apparatus and method of the invention thus enables a large number of differently sized drills and taps to be accurately and conveniently guided during hand operations. The probability of drilling an improper hole or of breaking a tap while using the invention is remote.

Other advantages, benefits, and features of the present invention will become apparent to those skilled in the art upon reading the detailed description of the invention.

DETAILED DESCRIPTION OF THE PREFERRED EMBODIMENTS

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
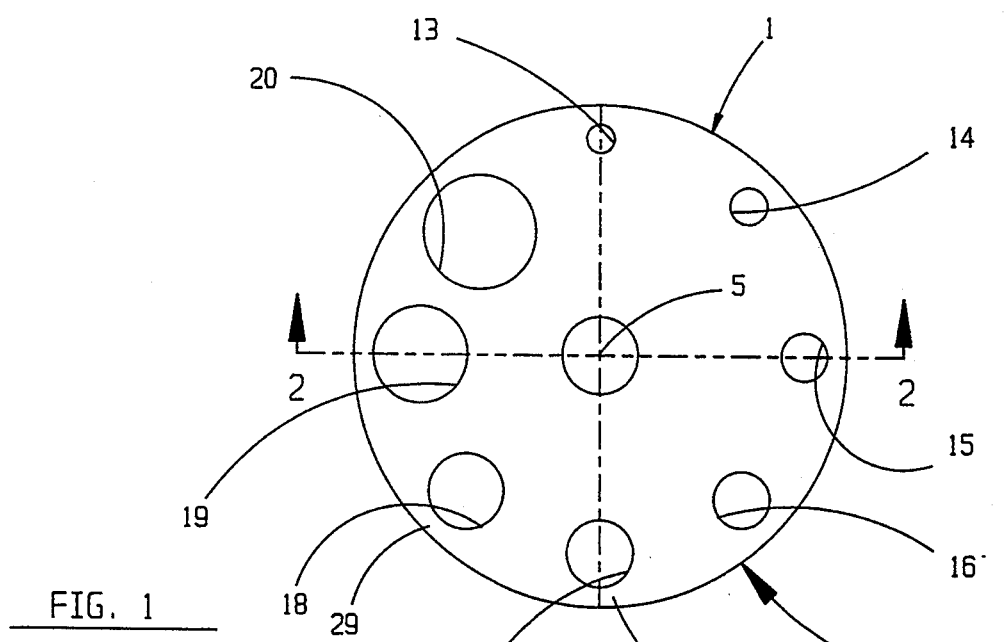
FIG. 1 is a top view of the drill and tap guide of the present invention.
Figure 2:
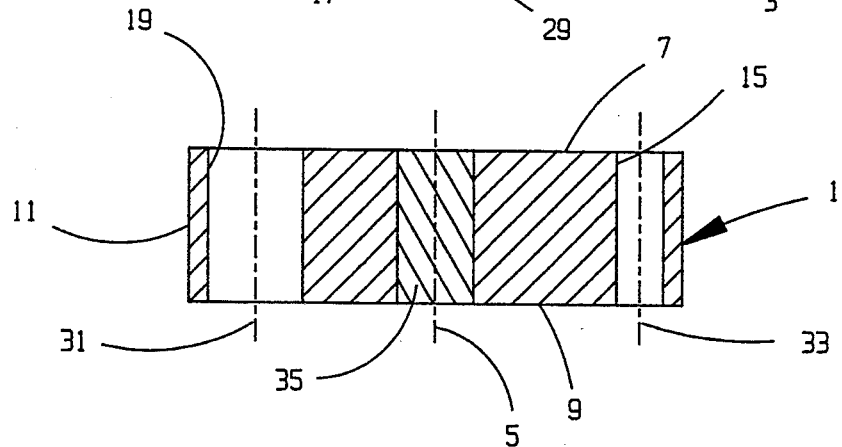
FIG. 2 is a cross sectional view taken along line 2—2 of FIG. 1.

Referring to FIGS. 1 and 2, a drill and tap guide 1 is illustrated that includes the present invention. The drill and tap guide 1 is particularly useful for guiding cylindrical cutting tools such as drills and taps during hand machining operations.

The drill tap and guide 1 is comprised of a cylindrical block 3 having a longitudinal axis 5, opposed faces 7 and 9, and a periphery 11. The faces 7 and 9 lie in respective planes that are perpendicular to the block longitudinal axis 5. A series of guide holes 13, 14, 15, 16, 17, 18, 19, and 20 are formed in the block 3 around and near the periphery 11. The longitudinal axes of the guide holes 13–20, such as the axis 31 of hole 19 and axis 33 of hole 15, are parallel to the axis 5.

The number and diameter of the guide holes 13, 14, 15, 16, 17, 18, 19, and 20 are chosen to suit the diameters of commonly used screw threads and of the taps used to produce the screw threads in workpieces. For example, the guide holes 13–20 may have the respective following nominal diameters: 0.188 inches, 0.250 inches, 0.313 inches, 0.375 inches, 0.438 inches, 0.500 inches, 0.625 inches, and 0.750 inches. In each case, the actual diameters of the guide holes 13–20 are slightly larger than the respective foregoing nominal diameters. I prefer that the guide holes 13–20 be arranged approximately equidistantly around the block periphery, and further that there be only narrow lands 29 of material between the block periphery and the respective guide holes.

The block 3 may be dimensioned to suit particular applications. I have found that a block having a diameter of approximately 3.13 inches for the periphery 11 and a thickness of approximately 0.94 inches between the faces 7 and 9 works very well.

The block 3 of the drill and tap guide 1 can be manufactured from a variety of materials. A satisfactory material is a high density polyproplene plastic material. Blocks of that material can be very economically manufactured by injection or die cast molding processes. A preferred material is 6061 aluminum hard coated to produce an anodized case approximately 0.002 inches thick of Rockwell C60 hardness. Blocks made of either material are light weight but durable.

It is feature of the present invention that a magnet 35 can be embedded in the block 3. The magnet 35 may be a bar magnet, as is shown in FIGS. 1 and 2. However, it will be understood that a horseshoe or other shaped magnet can be used. A particularly effective magnet is a horseshoe magnet embedded in a ceramic cylinder as manufactured by Storch Products Company of Livonia, Mich.

Figure 3:
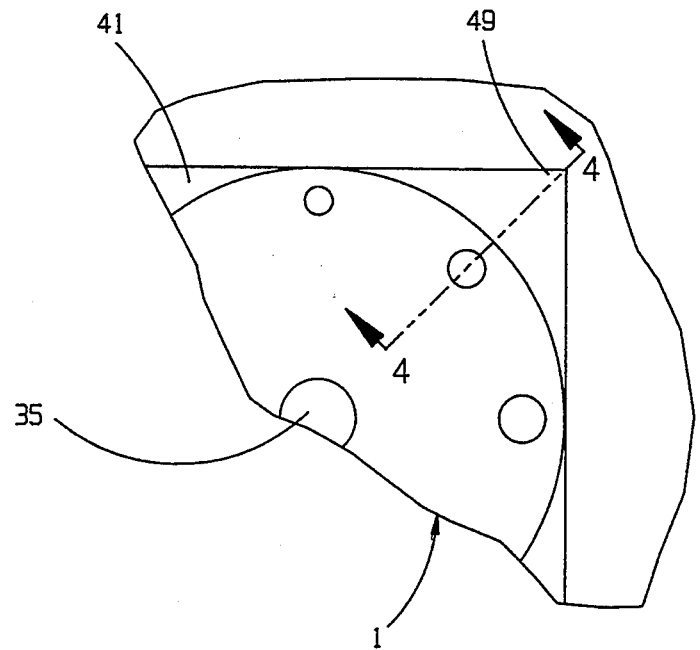
FIG. 3 is a partial top view showing the drill and tap guide in place adjacent an inside corner of a workpiece.
Figures 4, 5:
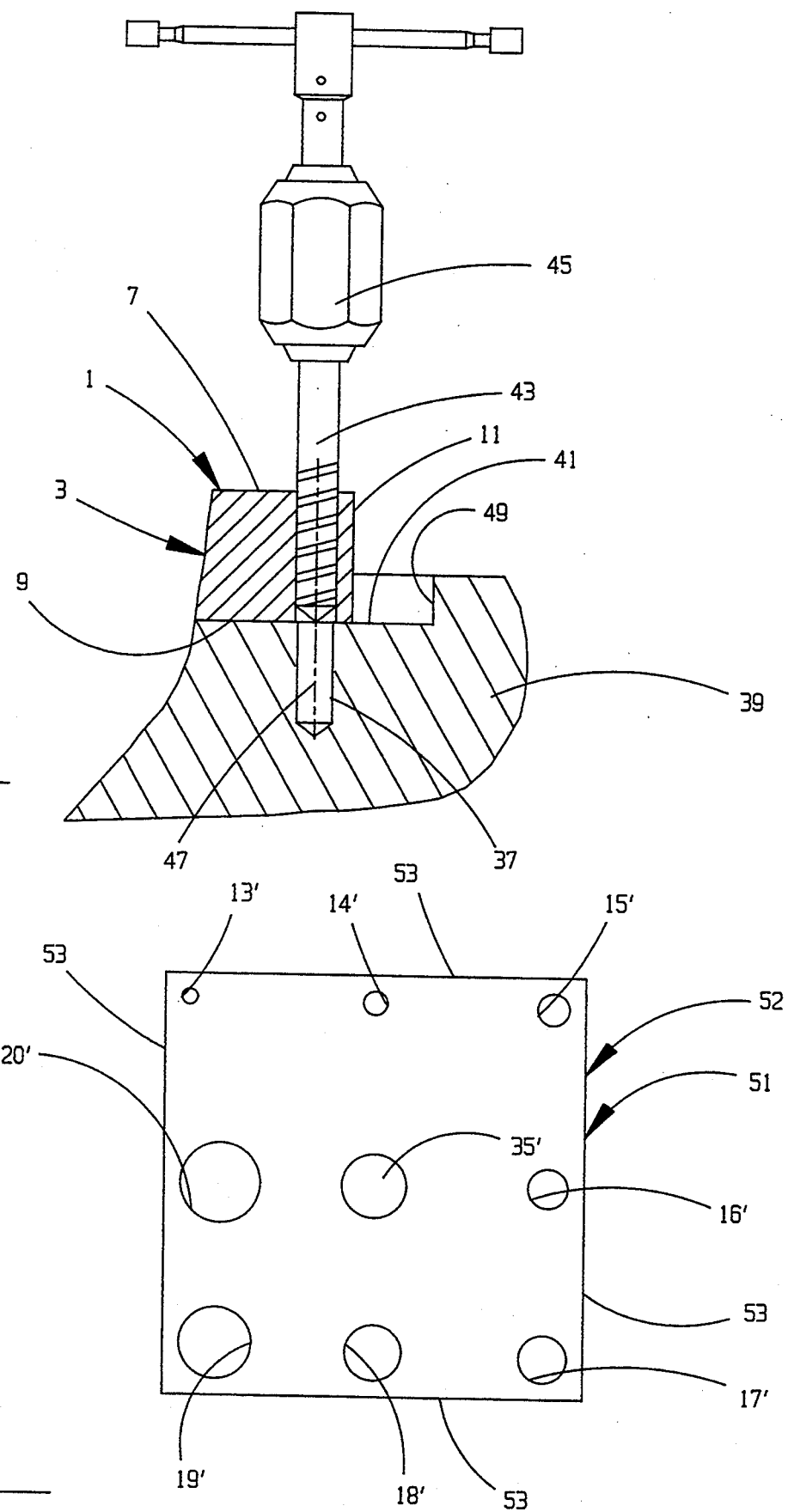
FIG. 4 is a cross sectional view taken along line 4—4 of FIG. 3 showing the drill and tap guide in use to guide a tap during a handtapping operation.
FIG. 5 is a top view of an alternate construction of the drill and tap guide.

FIGS. 3 and 4 show the drill and tap guide 1 in use to aid in tapping a hole 37 in a workpiece 39. One face 7 or 9 of the drill and tap guide is placed on the surface 41 of the workpiece 39 that contains the hole 37. The appropriate guide hole 13, 14, 15, 16, 17, 18, 19, or 20 of the drill and tap guide is aligned with the workpiece hole 37. A tap 43, held in a conventional tap holder 45, is inserted through the guide hole and partially into the workpiece hole. The drill tap guide maintains the tap 43 concentric with the longitudinal axis 47 of the workpiece hole, thereby assuring an accurate threaded hole in the workpiece and eliminating the possibility of tap breakage due to misalignment thereof with the workpiece hole. In addition, the time required to tap the hole is reduced because the need to continuously check tap alignment is eliminated. The circular periphery 11 of the drill and tap guide block 3 enables any of the guide holes 13–20 therein to be located near an inside corner 49 of the workpiece. The magnet 35 aids in holding the drill and tap guide in place on ferrous workpieces. The magnet is especially useful if the workpiece surface 41 is vertical.

Further in accordance with the present invention, the periphery of the drill and tap guide block need not be circular. For example, FIG. 5 shows a drill and tap guide 51 having a block 52 with a square periphery 53. The guide holes 13', 14', 15', 16', 17', 18', 19', and 20' are located close to the periphery 53 of the block 52. A magnet 35' can be incorporated into the drill and tap guide 51, if desired.

Figure 6:
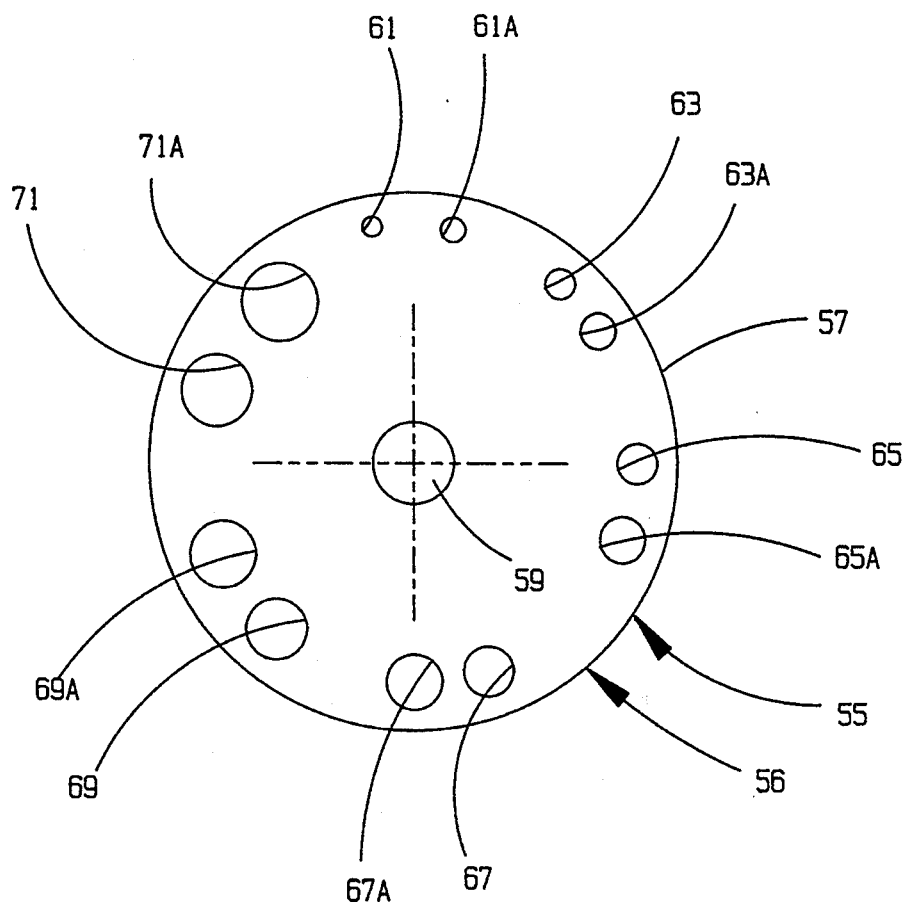
FIG. 6 is a top view of a further modified embodiment of the present invention.

A further modified embodiment of the invention is shown in FIG. 6. A drill and tap guide 55 has a block 56 with a circular periphery 57 and a magnet 59. Several pairs of guide holes 61, 61A; 63, 63A; 65, 65A; 67, 67A; 69, 69A; and 71, 71A are formed in the block 56 near and around its periphery 57. The holes 61A, 63A, 65A, 67A, 69A, and 71A have diameters that correspond to different diameter screw threads such as 0.188 inches, 0.250 inches, 0.313 inches, 0.375 inches, 0.438 inches, and 0.500 inches, respectively. The holes 61, 63, 65, 67, 69, and 71 have diameters that correspond to the tap drill sizes for the foregoing respective threads. For example, for the six thread diameters given, the preferred tap drill hole diameters are 0.150 inches, 0.201 inches, 0.257 inches, 0.313 inches, 0.368 inches, and 0.422 inches, respectively. The drill and tap sizes can be stamped or embossed adjacent the corresponding guide holes. In that manner, the drill and tap guide 55 can be used to guide both the tap drills and the taps for several sizes of threaded holes.

Figure 7:
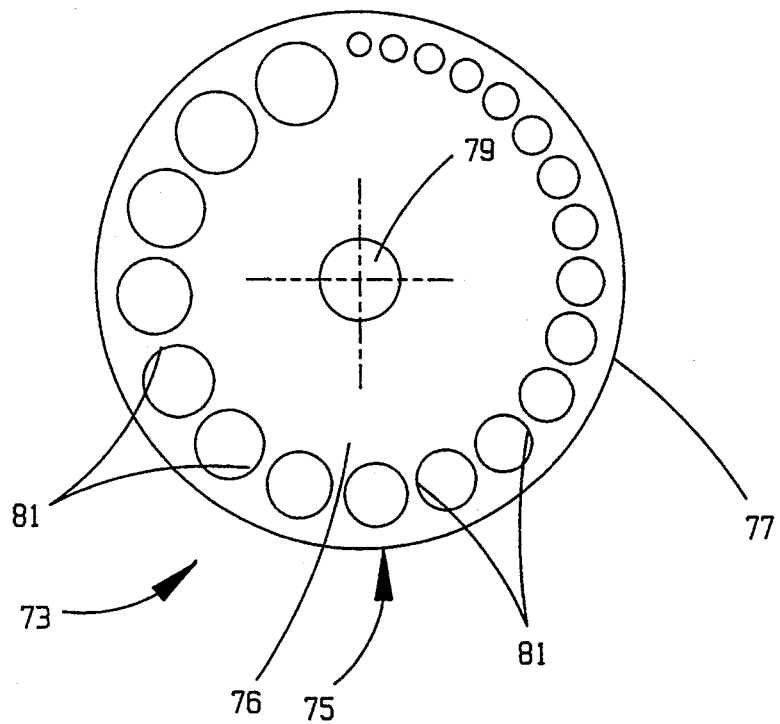
FIG. 7 is a top view of a drill guide for guiding drills during handy drilling operations.
Figure 8:
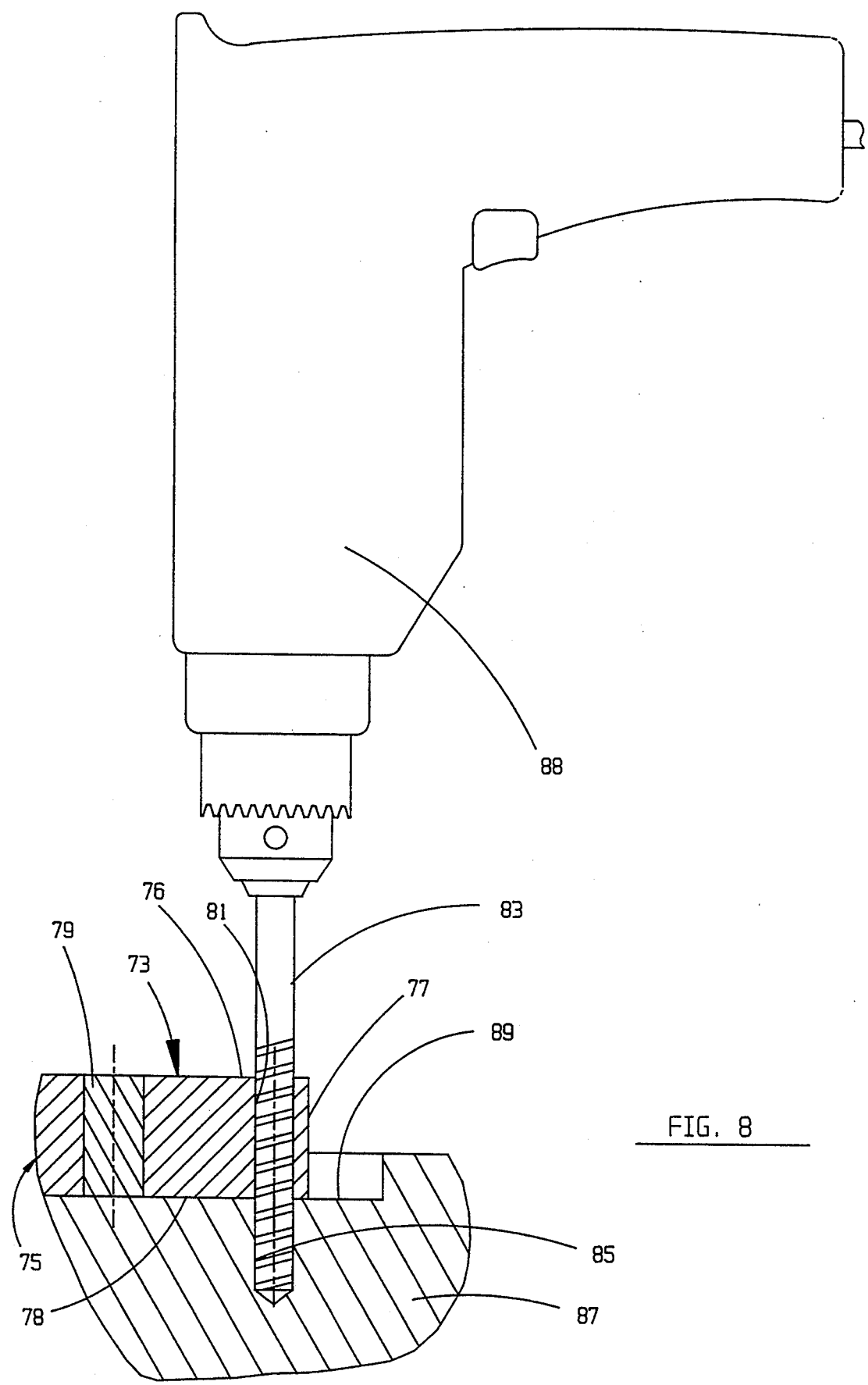
FIG. 8 is a cross sectional view of the drill guide of FIG. 7 showing it in use to guide a drill during hand drilling operations.

Now turning to FIGS. 7 and 8, a drill and tap guide 73 is comprised of a block 75 that has parallel faces 76 and 78 and a circular periphery 77. A magnet 79 is embedded in the block 75. A series of guide holes 81 are formed in the block and are spaced more or less equidistantly around the block periphery 77. In the illustrated construction, the guide holes 81 vary in diameter from slightly greater than ⅛th inch to slightly greater than ½ inch in 1/64th inch increments. The guide holes are thus suitable for guiding 24 different commonly used drill sizes during hand drilling operations.

FIG. 8 shows the drill and tap guide 73 in use to guide a drill 83 when drilling a hole 85 in a workpiece 87 using an electric hand drill 88. By using the drill and tap guide 73, the machinist is assured that the longitudinal axis of the hole 85 is perpendicular to the surface 89 of the workpiece 87.

Figure 9:
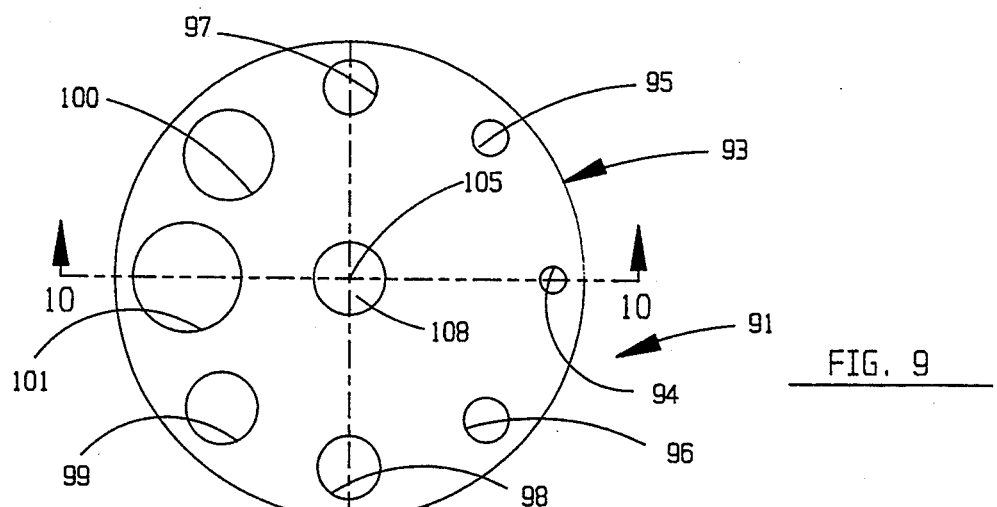
FIG. 9 is a top view of a drill and tap guide with the guide holes arranged in a different pattern.
Figure 10:
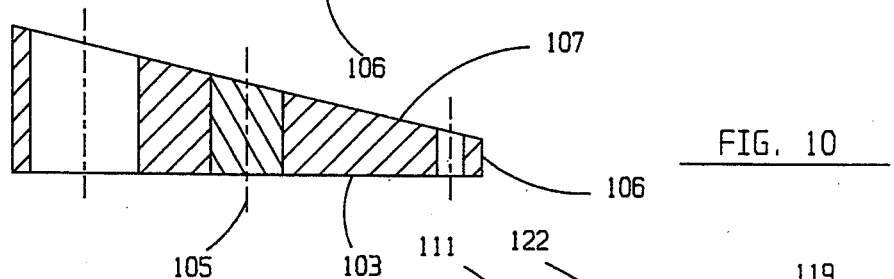
FIG. 10 is a cross sectional view taken along line 10—10 of FIG. 9.

The drill and tap guides 1 of FIGS. 1-4 and 73 of FIGS. 7 and 8 are shown with their respective blocks 3 and 75 having parallel opposite faces 7, 9 and 76, 78. However, the opposed faces of the blocks that comprise the invention need not be parallel. FIGS. 9 and 10 illustrate a drill and tap guide 91 having a cylindrical block 93 with a longitudinal axis 105 and a periphery 106. Guide holes 94, 95, 96, 97, 98, 99, 100, and 101 in the block 93 have respective longitudinal axes that are parallel to the block longitudinal axis 105. The block has a first face 103 that lies in a plane that is perpendicular to the block longitudinal axis 105. The second block face 107 lies in a plane that is non-perpendicular to the longitudinal axis 105. In that embodiment, the block 93 is thicker at the portion thereof containing the larger diameter holes 99, 100, and 101 than at the portion thereof containing the smaller diameter holes 94, 95, and 96. The drill and tap guide 91 may include a magnet 108.

Figure 11:
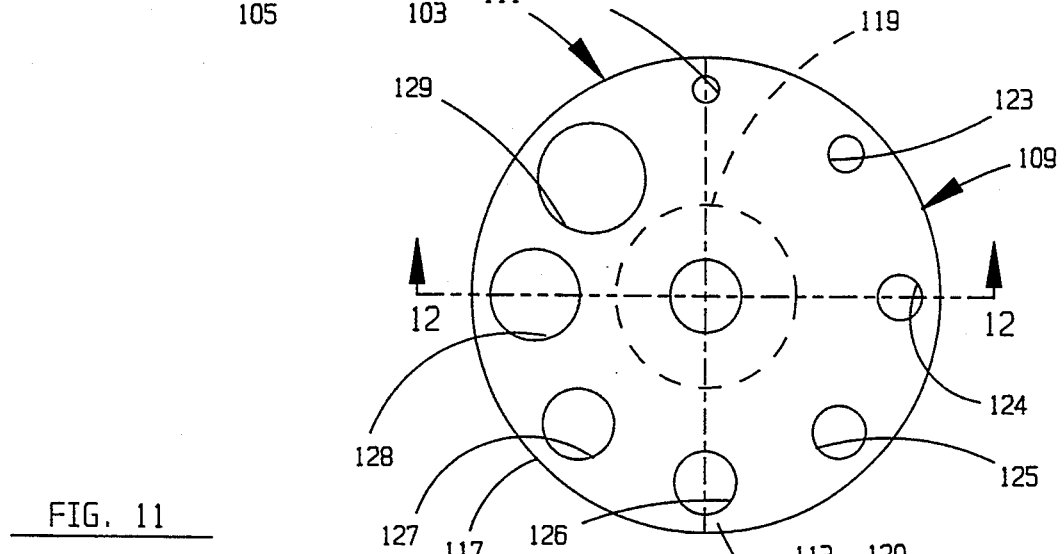
FIG. 11 is a top view of another embodiment of the present invention.
Figure 12:
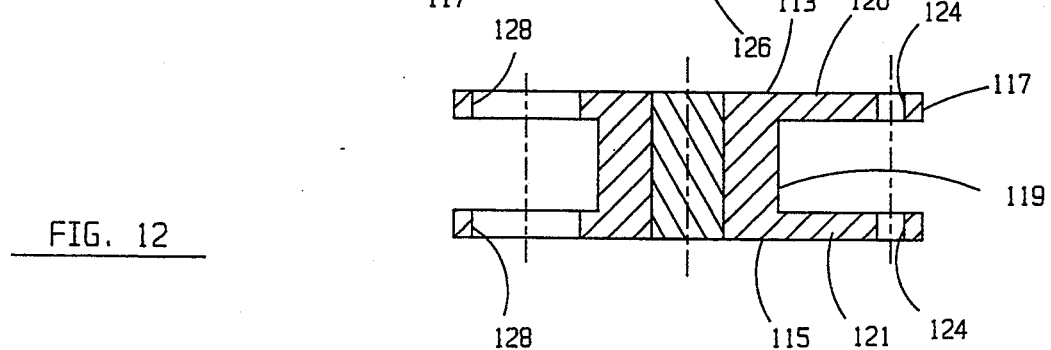
FIG. 12 is a cross sectional view taken along line 12—12 of FIG. 11.

The drill and tap guide 109 illustrated in FIGS. 11 and 12 is especially beneficial because it facilitates chip removable from a workpiece hole. For that purpose, the drill and tap guide 109 is comprised of a block 111 having a periphery 117 formed with a groove 119 between the opposed faces 113 and 115. Consequently, the block 111 defines two flanges 120 and 121. Guide holes 122, 123, 124, 125, 126, 127, 128, and 129 extend through both flanges 120 and 121. The flanges provide ample guidance for a drill or tap inserted through the appropriate guide hole 122-129, and the groove 119 provides space for easy chip removable from a workpiece hole.

In summary, the results and advantages of drills and taps used in machining threaded holes by hand can now be more fully realized. The drill and tap guide provides both a convenient and an accurate tool for the machinist. It will be also be recognized that in addition to the superior performance of the drill and tap guide, its construction is such as to be of very modest cost. Consequently, machinists can avail themselves of the benefits of the invention with minimal capital outlay.

Thus, it is apparent that there has been provided, in accordance with the invention, a drill and tap guide that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A drill and tap guide comprising a block free of attachment to any support external thereto and defining a block longitudinal axis, first and second faces, and a periphery, the first face lying in a plane that is perpendicular to the block longitudinal axis, the block further defining a plurality of first holes extending between the first and second faces and located proximate the block periphery and having respective longitudinal axes that are parallel to the block longitudinal axis, the first holes having respective different diameters that are slightly larger than the diameters of selected screw threads, the block first and second faces being spaced apart a distance sufficient to enable the first holes to guide selected taps without spatial wandering during rotation thereof, so that the first face of the drill and tap guide can be placed on and oriented relative to a workpiece independent of any support external to the drill and tap guide and the drill and tap guide is supported solely by the first face thereof placed on the workpiece with a selected first hole aligned with a hole in the workpiece and the selected first hole accurately guides a tap inserted therethrough and rotated to hand tap the workpiece hole, the block further defining a plurality of second holes therethrough each associated with and proximate a respective first hole and having respective longitudinal axes that are parallel to the block longitudinal axis, the second holes having respective different diameters that are slightly greater than the diameters of tap drills corresponding to the screw threads associated with the respective first holes, so that the drill and tap guide second holes accurately guide the tap drills corresponding to the taps that are guided in the respective associated first holes when hand drilling tap drill holes in the workpiece.

2. The drill and tap guide of claim 1 further including a magnet embedded in the block generally concentric with the longitudinal axis and adjacent the first face for aiding the alignment of the selected first hole with a hole in a ferrous workpiece.

3. A drill and tap guide comprising a block defining a block longitudinal axis, first and second faces, and a periphery, the first and second faces lying in respective planes that are perpendicular to the block longitudinal axis, the block further defining a plurality of first holes extending between the first and second faces and located proximate the block periphery and having respective longitudinal axes that are parallel to the block longitudinal axis, the first holes having respective different diameters that are slightly larger than the diameters of selected screw threads, the block first and second faces being spaced apart a distance sufficient to enable the first holes to guide selected taps without spatial wandering during rotation thereof, wherein the block defines two spaced apart flanges formed by a groove in the block periphery, the first holes passing through both flanges, the flanges providing accurate guidance for a selected tap inserted through the associated first hole, so that the first face of the drill and tap guide can be placed on a workpiece with a selected first hole aligned with the hole in the workpiece and the selected first hole accurately guides the tap inserted therethrough and rotated to hand tap the workpiece hole.

4. A drill and tap guide comprising a block having a longitudinal axis, a first face lying in a plane perpendicular to the block longitudinal axis, a second face, and a periphery extending between the first and second faces, wherein the first and second faces lie in respective parallel planes, the block being formed with a plurality of guide holes extending between the first and second faces and having respective longitudinal axes that are parallel to the block longitudinal axis, the guide holes having respective diameters that are slightly larger than the diameters of selected drills, the first and second faces being spaced apart a distance sufficient to enable the guide holes to guide the drills without wandering during hand drilling operations, the block first face being placeable on a workpiece, wherein the block periphery is formed with a groove to create first and second flanges associated with the block first and second faces, respectively, the respective guide holes passing through the first and second flanges to enable the flanges to accurately guide the selected drill inserted through the selected guide hole, so that a selected drill can be inserted through a selected guide hole and the drill guide accurately guides the drill when hand drilling a hole in the workpiece.

5. An article of manufacture having a longitudinal axis, a first face lying in a plane perpendicular to the longitudinal axis, a second face, and a periphery extending between the first and second faces, and defining a plurality of pairs of guide holes extending between the first and second faces with respective longitudinal axes perpendicular to the plane of the first face, each pair of guide holes including a tap guide hole having a diameter that is slightly greater than the diameter of a selected screw thread and a tap drill guide hole having a diameter slightly greater than the tap drill size of the selected screw thread, the first and second faces being spaced apart a distance sufficient to enable the guide holes to accurately guide a drill and tap that produce the selected tap drill hole and screw thread, respectively, in a workpiece when the first face is placed on the workpiece and the tap drill guide hole is located at a selected location on the workpiece for the tap drill and the tap guide hole is subsequently aligned with the tap drill hole for the screw thread.

6. An article of manufacture having a longitudinal axis, a first face lying in a plane perpendicular to the longitudinal axis, second face, and a periphery extending between the first and second faces, and defining a plurality of tap guide holes spaced apart proximate the periphery thereof, the tap guide holes having respective diameters that are slightly greater than the diameters of different selected screw threads with respective longitudinal axes perpendicular to the plane of the first face, the article of manufacture defining a plurality of drill guide holes having respective diameters that are slightly greater than the tap drill sizes corresponding to the screw threads associated with the respective tap guide holes to thereby enable the drill guide holes to accurately guide respective drills inserted therethrough that produce the tap drill holes in the workpiece, wherein the second face lies in a plane parallel to the plane of the first face, wherein the periphery is circular, wherein the first and second faces are spaced apart a distance sufficient to enable the tap guide holes to accurately guide drills and taps that produce the selected tap drill holes and screw threads, respectively, in a workpiece when the first face is placed on the workpiece and the tap guide holes are aligned with the associated tap drill holes for the screw threads in the workpiece, and further having first and second flanges separated by a groove in the periphery between the first and second faces, the tap guide and drill guide holes extending through the first and second flanges, so that the flanges accurately guide the taps and drills inserted through the associated tap guide and drill guide holes, respectively.

7. An article of manufacture comprising first and second faces that lie in respective parallel planes, a circular periphery extending between the first and second faces, and defining a first longitudinal axis that is perpendicular to the first face, and defining a plurality of guide holes therethrough that have respective longitudinal axes that are parallel to the first longitudinal axis and that have respective diameters that are slightly greater the diameters of selected drill sizes, the first and second faces being spaced apart a distance sufficient to enable the guide holes to accurately guide the selected drills while hand drilling holes in a workpiece, and further defining first and second flanges associated with the first and second faces, respectively, and separated by a groove in the periphery, the guide holes extending through the first and second flanges, the flanges accurately guiding drills inserted through the guide holes.

* * * * *